US009900369B2

(12) United States Patent
Afzal

(10) Patent No.: US 9,900,369 B2
(45) Date of Patent: Feb. 20, 2018

(54) DEVICE CHARACTERISTICS DETECTION AND EMULATION

(71) Applicant: Oracle International Corporation, Redwood Shores, CA (US)

(72) Inventor: Mirza Naeem Afzal, Mountain House, CA (US)

(73) Assignee: Oracle International Corporation, Redwood Shores, CA (US)

( * ) Notice: Subject to any disclaimer, the term of this patent is extended or adjusted under 35 U.S.C. 154(b) by 538 days.

(21) Appl. No.: 14/535,273

(22) Filed: Nov. 6, 2014

(65) Prior Publication Data

US 2016/0011756 A1 Jan. 14, 2016

Related U.S. Application Data

(60) Provisional application No. 62/023,127, filed on Jul. 10, 2014.

(51) Int. Cl.
*G06F 3/0484* (2013.01)
*H04L 29/08* (2006.01)
*G06F 9/44* (2018.01)

(52) U.S. Cl.
CPC ............ *H04L 67/02* (2013.01); *G06F 9/4443* (2013.01); *H04L 67/04* (2013.01)

(58) Field of Classification Search
CPC ............. G06F 11/3668; G06F 11/3624; G06F 11/3696; G06F 11/3664; G06F 11/3688; G06F 3/0482
See application file for complete search history.

(56) References Cited

U.S. PATENT DOCUMENTS

| 8,352,903 | B1 * | 1/2013 | Friedman | G06F 8/30 717/100 |
|---|---|---|---|---|
| 2006/0161864 | A1 * | 7/2006 | Windl | G06F 3/0482 715/810 |
| 2011/0239124 | A1 * | 9/2011 | Tsujimoto | H04N 1/00244 715/741 |
| 2015/0339216 | A1 * | 11/2015 | Wade | G06F 11/3688 714/38.1 |

* cited by examiner

*Primary Examiner* — Haoshian Shih
(74) *Attorney, Agent, or Firm* — Trellis IP Law Group, PC

(57) ABSTRACT

A system and method for facilitating characterizing a computing device or representation thereof. An example method includes obtaining information associated with a computing device that will be rendering a user interface display screen; providing a user option to adjust the information; and displaying the user interface display screen in accordance with adjusted information. In a more specific embodiment, the method further includes selectively transferring the adjusted information from a client device to a server. A browser of the client device may display a form factor drop down menu that facilitates user specification of a form factor of a computing device. The user specification facilitates displaying an emulation of the computing device or otherwise facilitates adjusting a user interface display screen to be rendered.

30 Claims, 5 Drawing Sheets

DEVICE CHARACTERISTICS DETECTION AND EMULATION

CROSS REFERENCES TO RELATED APPLICATIONS

This application claims priority from U.S. Provisional Patent Application Ser. No. 62/023,127, entitled DEVICE FORM FACTOR DETECTION AND EMULATION, filed on Jul. 10, 2014, which is hereby incorporated by reference as if set forth in full in this application for all purposes.

BACKGROUND

The present application relates to computing, and more specifically to software, User Interfaces (UIs), methods, and accompanying systems for determining characteristics of a computing device and making adjustments to software based on the characteristics.

Systems and methods for determining device characteristics are employed in various demanding applications, including webpage software for adjusting the rendering of a webpage based on automatically detected device software capabilities; emulators for enabling developers to view and test how a given application and/or browser window will appear when rendered on a particular device; enterprise Quality Assurance (QA) tasks, whereby QA personnel test appearance and functioning of a given user interface display screen to be presented via a browser window, and so on. Such applications often demand flexible systems that can accommodate detection and emulation of various computing device features and capabilities, without undue effort and expense.

Systems and methods for providing device detection and/or emulation capabilities are particularly important in enterprise applications, where network accessible software must often be tested and configured for various computing devices and use cases, including use cases involving various smartphones and tablets with varying form factors.

Different devices may exhibit different features, which may affect rendering of an enterprise application page in a browser window. Enterprise quality assurance personnel may be tasked with ensuring that users of different devices can adequately use cloud-based enterprise applications. In addition, software developers, which may communicate with the QA personnel, may require mechanisms, e.g., emulators, for testing software and making coding adjustments to ensure that web applications render as desired in different device displays. QA personnel and developers often require software tools to facilitate testing application behaviors on different computing platforms, i.e., devices.

Conventionally, QA personnel or developers may employ different emulators for different known devices to access and test network-based software applications rendered in a browser. The emulators may employ virtual machines to run computer code and display user interface features consistent with the particular device being tested. However, as subsequent generations of mobile computing devices and accompanying software rapidly change, emulators may not be available for the new computing devices. Testing can be critical to ensuring that a new product runs properly on various categories of devices.

Alternatively, physical devices are purchased for testing purposes. However, purchasing separate devices for all QA personnel and developers can be prohibitively expensive.

Accordingly, enterprise QA personnel and developers must often guess how particular web applications will appear in newly developed client devices, e.g., smartphones, tablets, and so on.

SUMMARY

An example method for facilitating characterizing a computing device or representation thereof (e.g., for the purposes of emulating a computing device or otherwise adjusting a rendering of user interface display screen on the device) includes obtaining information associated with a computing device, e.g., a computing device that will be rendering a user interface display screen or will otherwise be emulated; providing a user option to adjust the information; and displaying the user interface display screen in accordance with adjusted information.

In a more specific embodiment, the user interface display screen includes a representation of one or more web resources, e.g., website content and associated functionality. The example method further includes selectively transferring the adjusted information from a client device to a server. Examples of client devices include developer systems used to develop and/or test web applications and customers who would like to adjust webpage rendering.

Server-side software may be adapted to use the adjusted information to adjust one or more behaviors of a software application (such as webpage software and/or a browser used to access the webpage software) used to render the user interface display screen. The adjusted information may be stored via a cookie of a browser running on the client device. The server-side software may also adjust styling of the user interface display screen based on the adjusted information.

The example method may further include providing the user option (to adjust the information associated with the computing device) via one or more user interface controls presented via the user interface display screen. The one or more user interface controls may include a drop-down menu with user selectable form factor information, and one or more check boxes for enabling user specification of one or more device capabilities or available functionality, e.g., touch screen functionality, device location abilities (e.g., Global Positioning System functionality), and so on.

A client-side script, e.g., written in JavaScript, may automatically detect one or more features of the computing device and accompanying software and then incorporate one or more descriptions or indications of the one or more features (along with user specified device information) in a cookie stored on the computing device.

The example method may further include and/or alternatively include the following method: providing a first user option to specify device information, including information characterizing one or more physical characteristics of the computing device; automatically determining one or more preexisting software capabilities of the computing device; and adjusting a user interface display screen based on the one or more user specified physical characteristics and the one or more preexisting software capabilities.

A browser cookie may store information describing the one or more physical characteristics and the one or more preexisting software capabilities. Server-side and/or client-side software may then selectively access the cookie to determine an adjustment to be made to rendering instructions used to display the user interface display screen in as a browser window. The user interface display screen may display an application window for a server-side application that is accessible via the client device running the browser.

The example method may further include and/or alternatively include the following method: detecting a browser of a computing device; triggering display of a form factor drop-down menu in a window of the browser in response to the detecting; receiving user input characterizing a form factor of a computing device based on one or more user entries made via the form factor drop-down menu; and employing the user input to display an emulation of the computing device based at least in part on the user input.

Hence, certain embodiments discussed herein are adapted to enable detection and emulation of devices for facilitating application development, testing, and/or user customizability of application rendering, in part by providing one or more user options to specify device form factor information for a device to be detected and/or emulated. For example, a user may browse to a website entry page, which then displays a form factor drop-down menu to facilitate form factor selection; then a cookie value is set with device information. JavaScript may be run on browser to detect additional device information. A browser cookie may then be updated with user selected information and automatically detected information. Server-side software (e.g., as made available via the website) may then use the cookie to make adjustments for different device functions and behaviors, including functionality and styling.

By providing user options to specify device information, e.g., form factor and capabilities, various emulators can be quickly setup and tested. This facilitates rapid software development and testing (e.g., quality assurance testing) for new devices and hypothetical future devices. This may also facilitate selectively enabling specific application functionality provided by web applications based on specified device characteristics.

Conventionally, efficient tools for enabling browsers to expose form factor information to web applications are lacking. Tools for rapidly emulating new or non-existing hypothetical devices based on specified information are also lacking.

Certain embodiments discussed herein may further enable users to easily change browser defaults to emulate certain features of different devices, e.g., by checking and unchecking different device features. Accordingly, developers and quality assurance testers may more readily develop, test, and offer websites and webpages that function as intended with various different form factors and feature sets.

Hence, certain embodiments discussed herein provide a way of transferring information pertaining to a device that will be rendering an application; then using that information to either render the page appropriately and/or to facilitate development or testing by providing device emulation.

A further understanding of the nature and the advantages of particular embodiments disclosed herein may be realized by reference of the remaining portions of the specification and the attached drawings.

DETAILED DESCRIPTION OF EMBODIMENTS

Figure 1:
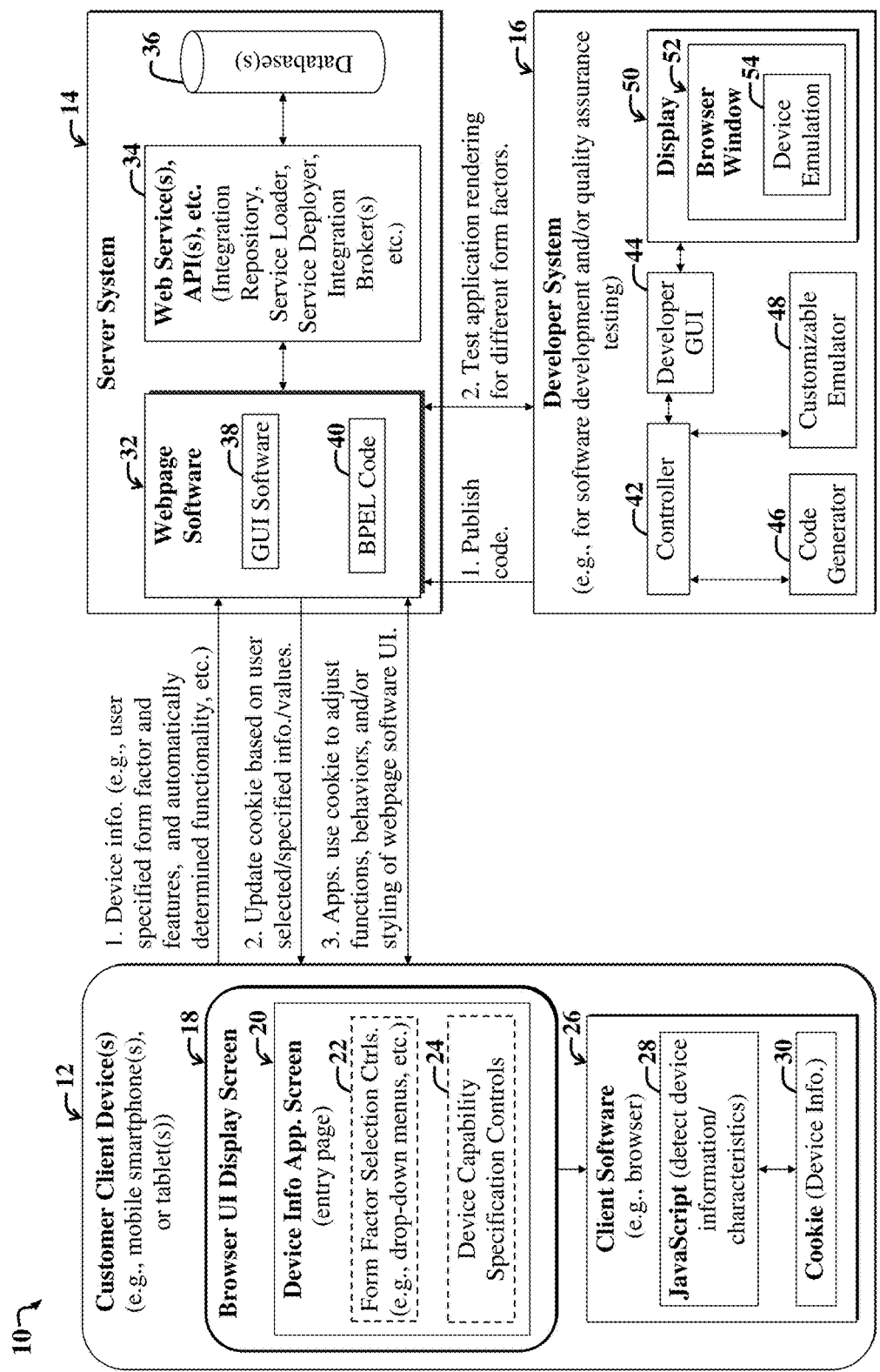
FIG. 1 is a diagram illustrating an example embodiment of an enterprise system incorporating device form factor determination and/or emulation capabilities for facilitating rendering customer pages and/or for testing application display characteristics and behaviors for various computing devices and accompanying form factors.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. The terms "enterprise software" and "enterprise application" may be employed interchangeably herein. However, an enterprise application may include one or more enterprise software modules or components, such as User Interface (UI) software modules or components.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

Enterprise computing environments often demand efficient mechanisms for testing and emulating various devices to be used to access software functionality. Quality assurance testing tools are often not available for all devices, which may inhibit automation of quality assurance testing.

Enterprise systems, including systems providing cloud services, must often be adapted to be compatible across various different devices and systems. It may be prohibitively costly for enterprises to purchase physical devices for testing purposes for all developers and quality assurance testing personnel.

Considering that device form factors often quickly evolve, and specific emulators for the new devices are often slow to follow, a need remains for efficient mechanisms for modeling, emulating, and testing devices, including future hypothetical devices.

The many different categories of devices often make it difficult to develop efficient and cost effective mechanisms for testing new software and/or hardware for sufficient device categories. But, such testing can be very important or critical to ensuring that a new product runs properly on the desired categories of devices.

While certain software applications and code libraries, such as Modernizr JavaScript library, may be employed to detect certain software features or capabilities of browsers used to access websites, software for such feature detection typically lacks device emulation capabilities and lacks user options for specifying different device form factors.

For clarity, certain well-known components, such as hard drives, processors, operating systems, power supplies, Internet Service Providers (ISPs), class loaders, bytecode compliers, and so on, are not explicitly called out in the figures. However, those skilled in the art with access to the present teachings will know which components to implement and how to implement them to meet the needs of a given implementation.

FIG. 1 is a diagram illustrating an example enterprise system 10 that is adapted to enable device form factor determination and/or emulation, which may be particularly useful for software development and testing and, in certain implementations, to automatically adjust webpage rendering, including styling and functionality provided thereby.

Note that, in general, groupings of various modules of the system 10 are illustrative and may vary, e.g., certain modules may be combined with other modules or implemented inside of other modules, or the modules may otherwise be distributed differently among a network or within one or more computing devices, without departing from the scope of the present teachings.

The example system 10 includes a mobile client device 12 and a developer system 16 in communication with a server system 14 via a network, such as the Internet. The example client device 12 may represent a device of a customer of one or more services (e.g., cloud services) provided by the server system 14 of the enterprise system 10. The developer system 16 may represent a computer system that is adapted for developing, testing, and publishing software, e.g., webpage software 32, to the server system 14.

For the purposes of the present discussion, a developer system may be any computer that includes one or more tools for developing and/or testing computer programs, such as web applications. Note that while quality assurance personnel may test software without developing applications per se, computer systems that are adapted to facilitate testing functionality and appearance of software applications may also be considered as developer systems for the purposes of the present discussion.

A mobile computing device may be any computer that is adapted for portable use. In general, a computing device may be any computer. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on.

Various specific example embodiments discussed herein may employ a mobile computing device that is further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

For the purposes of the present discussion, the term "computing device" is taken to include non-physical devices, e.g., emulated devices, including hypothetical future devices. An emulated device may be any software representation of a device or characteristics (including functionality) thereof, which is adapted to approximate or regenerate a model of (i.e., emulation of) the computing device to be run as software. For example, mobile device developers may employ a developer system (e.g., desktop computer running software development tools) to run various emulators for different known (or anticipated future) mobile devices and accompanying platforms, e.g., iPhone, Blackberry, etc.

The server system 14 may represent a collection of one or more servers, e.g., web servers, application servers, and accompanying backend enterprise applications and databases. Examples of databases that may be included among the databases 36 of the server system 14 include Customer Relationship Management (CRM), Business Intelligence (BI), and Human Capital Management (HCM) databases.

The server system 14 may include one or more Service Oriented Architecture (SOA) servers. An SOA server may be any server that is adapted to facilitate providing services or subprocesses accessible to one or more client computers coupled to a network. In general, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A client device may be any computing device that acts as a client to a server.

The example client device 12 includes a browser User Interface (UI) display screen 18 in communication with client software 26, such as a browser. The client software 26 is adapted to run client-side scripts, such as JavaScript 28, and to store information, such as device information maintained via one or more cookies 30.

For the purposes of the present discussion, a cookie may be any writable portion of data stored on a client device. Information stored in a cookie, e.g., browsing or navigation history information, is often delivered from a website to a client device and stored on the client device. A browser cookie may be any cookie that is stored by and/or otherwise adapted to be accessed by a browser. A browser may be any computer application that is adapted to facilitate software navigation of the World Wide Web or Internet or to otherwise access web resources thereof.

A web resource may be anything that can be named and addressed via a computer network, including computing language classes, objects, Application Programming Interfaces (APIs), web services, and so on. In general, anything that may be electronically referenced in a networked computing environment, e.g., via a Uniform Resource Identifier (URI) or web address, such as a URL, can be considered a web resource. A URI may be any string of characters specifying a network address.

Navigation may refer to any process whereby a UI display screen is updated to reveal different data and/or a different configuration of UI elements in a display screen. In the case of a browser being used to browse the Internet, the different data and/or displayed elements (e.g., UI controls, windows, etc.) may represent web resources or Internet resources, which may be associated with different websites.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or page. Pages may include sections, such as sub-views or sub-windows, dialog boxes, graphs, tables, other UI display screens, and so on. In certain cases, a UI display screen may refer to all application windows presently displayed on a display.

The example browser UI display screen 18 is shown rendering a device information application screen 20 (also called the entry page or log-in page), which includes form factor selection controls 22 and device capability specification controls 24. Computer code for rendering the device information application screen 20 may come, in part, from webpage software 32 running on the server system 14.

The example webpage software includes Graphical User Interface (GUI) software 38 and computer code 40 for implementing webpage functionality, e.g., for facilitating providing UI controls and access to databases 36 via one or more web services and/or APIs 34. The example computer code 40 may include code written in Business Process Execution Language (BPEL) and/or other languages, e.g., Java, Web Services Description Language (WSDL), and so on.

The GUI software 38 is adapted to generate rendering instructions for webpages, such as a webpage represented by the device information application screen 20 of the browser UI display screen 18.

In the present example embodiment, the webpage software 32 is adapted to employ the one or more web services and/or APIs 34 to selectively access data maintained in databases 36. The web services and/or APIs 34 may include integration repositories, service loaders, service deployers, integration brokers, and so on, as needed for a given implementation.

The example developer system 16 includes a display 50, which is shown presenting a browser window 52 showing a device emulation 54. For the purposes of the present discussion, a device emulation may be any software model of a computing device. The software model may approximate or describe an existing device and/or a hypothetical device. The terms "device emulation" and "device emulator" may be employed interchangeably herein.

A developer GUI 44 is adapted to provide rendering instructions to render one or more software development tools via the display 50 to facilitate software testing and development. For example, the developer GUI 44 may selectively access functionality provided by a code generator 46 and a customizable emulator module 48. A controller 42 is adapted to facilitate routing signaling between the various modules 44-48. The controller 42 may also include functionality for interfacing the developer system 16 with the server system 14, e.g., to enable the developer system 16 to publish and/or to otherwise modify the server-side webpage software 32.

The code generator 46 facilitates automatic computer code generation. The customizable emulator module 48 facilitates generating computer instructions for controlling behaviors and appearances of the device emulation 54.

In an example scenario, which may be experienced by a user of the client device 12, the user browses to a website provided via the webpage software 32. An entry page (e.g., the device information application screen 20) is then displayed via the browser UI display screen 18 of the client device 12. The user then employs features 22, 24 of the entry page to specify device form factor information and to select and/or deselect other capabilities and/or features of a device to be emulated via the client device 12 or of the client device 12 itself.

For the purposes of the present discussion, device information may be any data or information characterizing or otherwise associated with a computing device. For example, the information may include information about device software capabilities and features and/or may include information about device physical characteristics, memory resources, processor characteristics, and so on. Information associated with a device may include device usage history, user identity information, and other context information, such as form factor information.

A physical characteristic of a device may be any property or visible aspect included in or otherwise associated with or characterizing a device, e.g., computing device. Examples of physical characteristics include display screen dimensions, pixel density, information indicating whether the device includes a Global Positioning System (GPS) location capabilities (or other geographic location features); information indicating whether the device provides touch screen functionality, and so on, as discussed more fully below.

Device form factor information may be any information characterizing one or physical dimensions of a computing device, such as screen dimensions and/or resolution. Form factor information may also include general size categories, e.g., small, medium, large, and so on, and/or relative dimensions or proportions, e.g., the ratio of the screen to the width of the phone body.

For the purposes of the present discussion, a form factor drop-down menu may be any UI control that is adapted to receive user input specifying form factor information.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

User specified device information may be augmented with and/or may replace certain automatically determined device information. The webpage software 32 may also trigger automatic collection of information specifying certain device software capabilities, e.g., browser type, whether certain plug-ins are available, and so on. Client-side scripts, e.g., written in JavaScript, may also be employed to provide client device information to webpage software, e.g., via a browser cookie. Preexisting software (e.g., Modernizr) for automatically discovering certain device software capabilities may be employed to perform automatic device software capability detection, without departing from the scope of the present teachings.

For the purposes of the present discussion, a software capability may be any software functionality accessible via a computing device. Software functionality may be any function, behavior, or feature, e.g., stored or arranged data, that is provided via computer code, i.e., software. Generally, software functionality may be accessible via use of a UI and accompanying UI controls and features. Software functionality may include actions, such as retrieving data pertaining to a business object; performing an enterprise-related task, such as promoting, hiring and firing enterprise personnel, placing orders, calculating analytics, launching certain dialog boxes, performing searches, and so on. Software functionality may also include features, e.g., software features enabling retrieval of data from a GPS receiver or other sensor.

In the present example scenario, user specified device information, including form factor information, is selectively combined with any automatically determined device information and stored in one or more cookies 30. The cookies 30 may then be accessed by software running on the server system 14, e.g., the webpage software 32, to adjust webpage functions, behaviors, and/or styling. For the purposes of the present discussion, styling of a UI display screen (e.g., corresponding to a displayed webpage) is said to be adjusted if one or more visual features, characteristics, or appearances of the UI display screen are changed.

In another example scenario, which may be experienced by a user of the developer system 16, a software developer employs the developer system 16 to develop and then publish the web page software 32 or portions thereof to the server system 14. The developer then employs the customizable emulator module 48 to generate an emulation 54 of a device to be tested. Device behavior is then tested via use of the device emulation 54, and any responsive adjustments are then made to the webpage software 32.

A developer may employ a browser running on the developer system 16 to provide form factor specifications and/or other developer-specified device characteristics, which are used by the customizable emulator module 48 and GUI 44 to generate rendering instructions for rendering the device emulation 54. By providing different device specifications, different customized device emulators 54 may be displayed. The emulators 54 may then be used to test how different pages provided by the webpage software 32 are rendered, including testing webpage software functionality.

Alternatively, or in addition, a developer may employ different device emulations 54 to test webpage software before it is published to the server system 14. Different device emulations are generated based on specified form factors and/or other device characteristics or capabilities.

Furthermore, note that personnel other than developers, e.g., quality assurance testing personnel, may employ device emulators 54 to test software rendering and associated behaviors. Device emulators (also called device emulations) 54 may be readily employed to emulate existing devices or hypothetical future devices that may have different form factors.

Hence, various embodiments may be adapted for use with developers, testers, and end users to either test different device form factors and/or to otherwise trigger automatic adjustment of webpage software and rendering thereof based on supplied device form factor information. In various scenarios, users (including customers, developers, and testers) may browse to a website entry page, which provides a form factor drop-down (and/or other controls 22, 24) to facilitate form factor selection. Browser cookie values may then be set with user specified device information. A client-side script, e.g., written in JavaScript and running on a browser, may automatically detect additional information that may not be user-specified via the entry page. Cookies may be updated as needed with user specified information and/or automatically detected information. The server-side webpage software 32 may then use the cookies to make adjustments for different webpage functions and behaviors, which include both functionality and styling.

Figure 2:
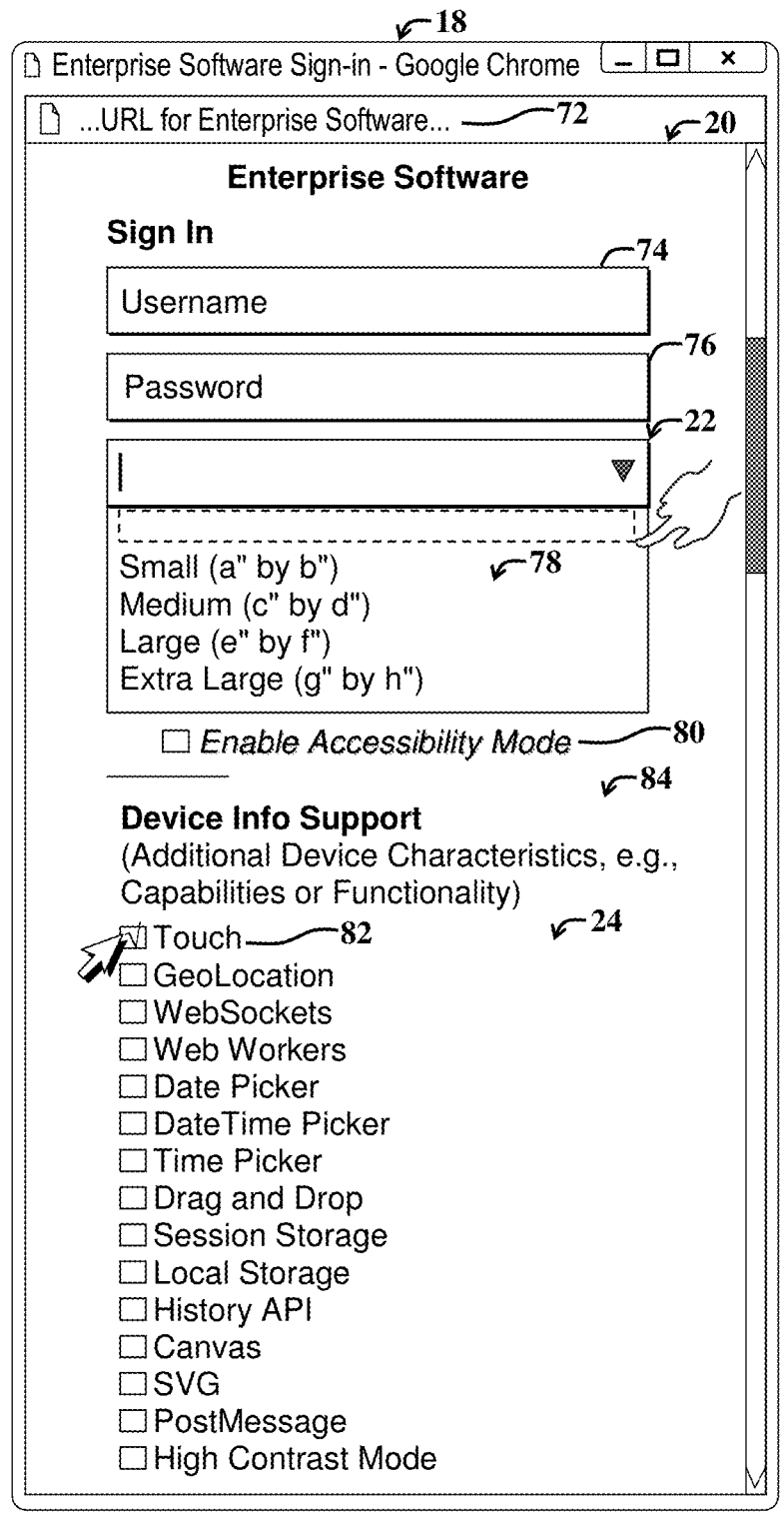
FIG. 2 shows a first example UI display screen, which may be displayed on the client device of FIG. 1, and which illustrates user interface controls that provide user options for selecting and/or specifying different device characteristics.

FIG. 2 shows a first example UI display screen 18, which may be displayed on the client device 12 and/or developer system 16 of FIG. 1, and which illustrates UI controls 22, 24, 80, that provide user options for selecting and/or specifying different device characteristics, e.g., form factor and device features or capabilities, which may be used for running and rendering applications on a computing device.

The UI display screen 18 may present a sign-in page (also called entry page 20) for an enterprise website, as rendered in a browser window. A URL 72 for the entry page 20 is shown in a header above the content display area of the entry page 20.

The example entry page 20 includes a sign-in section with fields 74, 76 for entering user authentication information, e.g., username 74 and password 76. A form factor drop-down menu control 22 is provided below the username and password fields 74, 76.

The example drop-down menu 22 includes various user selectable form factors 78. In certain implementations, a user may also (and/or alternatively) type in or otherwise enter screen dimensions in a field of the drop-down menu 22. Example form factors 78 include small, medium, large, and extra large form factors. Note that exact contents of the drop-down menu 22 may be implementation specific and may vary, without departing from the scope of the present teachings.

An example accessibility mode check box option 80 is provided for enabling a user to specify that the computing device being used or to be emulated will be operating in an accessibility mode. Accessibility mode may affect, for example, displayed font size, contrast settings, and so on. Exact details as to what constitutes an accessibility mode may be implementation specific and may vary, without departing from the scope of the present teachings. Nevertheless, different device modes may be associated with a set of features or characteristics that may be used by the emulator module 48 to generate accurate device emulations 54.

An additional device information section 84 includes various UI controls, e.g., check boxes 24, which are adapted to enable user selection of various additional device characteristics, capabilities, or functionality. For example, user selection of a touch option 82 may trigger storage of information in a cookie that specifies that the device accessing a webpage exhibits touch screen functionality. For the purposes of the present discussion, touch screen functionality may be any features or characteristics of a device that are adapted to enable user manipulation (e.g., by providing touch input) of a UI display screen by providing touch input applied to a display.

Hence, user input provided via the form factor selection controls 22 and other controls 24 for providing user options to select or specify other device features may be stored on a cookie and used for device emulation and/or otherwise for adjusting rendering and behaviors of a webpage.

When a user first signs into the webpage software 32 of FIG. 1, e.g., via the entry page 20 of FIG. 2, the user is provided with one or more form factor specification controls 22 and other controls 24. The other controls 24 may represent an automatically populated list of features which are available on a computing device used to generate a device emulation. Such user options provided by the controls 22, 24 may represent user options to change various default browser settings to facilitate emulation of certain features of different devices, by selecting and/or deselecting different device features.

In general, computing devices come in many different models and types. These include mobile phones such as smartphones, tablets, laptops, desktop and other computers. Each device type and model, referred to as a category of device, can have many different features and configurations. For example, there are many different sizes and resolutions of screens among different devices. Devices may have touch screens, geographical location ability, high contrast modes for displaying information, etc.

Because of the many different categories of devices it is often difficult to efficiently test new software and/or hardware for sufficient categories. Mechanisms for facilitating such testing may be provided by various embodiments discussed herein.

As discussed more fully below, one embodiment allows a host device in a particular category of devices to be configured to act as a different type of device. For example, a device with a larger display can be configured to emulate a smaller display by using a smaller portion of the larger display screen, and/or by changing the displayed resolution. If a host device has geo-location and it is desired to test a product on a device without geo-location then the geo-location ability of the host device can be turned off for purposes of emulation.

Similarly, if a host device lacks a high-contrast display mode, the high-contrast display mode can be implemented by changing the color palette used for the display, etc. The set of features that is available on a device, such as screen size, touch screen ability, geo-location, high-contrast display, etc. may be referred to as device information.

Form factor information may specifically refer to information characterizing physical attributes of a device, e.g., display size, resolution, and so on, as discussed more fully herein.

One embodiment allows a host device to be configured with a form factor for a target device by determining the features on the host device and allowing automatic or manual disabling and/or adding (e.g., by emulation or simulation) of features that are necessary for the host device to emulate the target device for purposes of running or testing software and hardware products on the host device that are designed for the target device.

Hence, in summary, the username and password fields 74, 76 may represent text boxes at 74 and 76 for enabling a user to enter their account name and password, respectively. The drop-down menu 22 enables user selection of screen size from a list of desired target device screen sizes. In this example, the predefined screen sizes 78 are given generically as "Small," "Medium," "Large," and "Extra Large." In other embodiments, specific device types or categories, or even brands and models can be provided. The number and type of screen size selections can be changed, and the manner of selecting the screen size can be different in different embodiments.

A particular embodiment provides a selection to enable an "Accessibility Mode" at 80. This may allow, for example, text on pages to be generated so that text-to-speech screen readers can read the text. At 24 the user is provided with toggles or selections for various features desired to emulate a target device. When the user first accesses the interface, or launches the associated system (e.g., webpage software 32 of FIG. 1), "deviceInfo" values are stored in a cookie on the host device in a manner that is known in the art.

In a particular embodiment, JavaScript® is run on a browser that executes interface 18 to detect all automatically available information of the host device configuration. Once the user chooses the various form factor features, the cookie value is updated based on the selected values. The applications being tested may rely on the cookie values to make adjustments for different functions and behaviors that can include both functionality and styling.

The features that are available on the host device can be obtained automatically, or in cases where they cannot be obtained automatically, the user can be prompted, a database can be accessed, or some other source or method can be used to identify available features.

In a particular embodiment the form factor features in the host device, such as height and width of the host device screen, whether there is touch control, whether there is a high contrast mode or not, etc. can be obtained automatically. On some devices such as an iPhone® when there is a field type "Date," the iPhone provides a specific utility or interface widget referred to as a "date picker." In the case where the host device is running the interface 18 in a browser that doesn't have a date picker, then the date picker functionality is provided to the host device for purposes of emulating the date picker feature. The number of features that are detected, managed and emulated can vary.

The various user options 24 include a user option to select "Touch," which allows the user to select whether the emulation should include a touch screen as an input device. If a touch screen is detected on the host device then this selection may be initially checked as a default selection that the user can uncheck if the touch screen feature is not desired. Similarly, for the other selections shown in FIG. 2 as follows:

GeoLocation—indicates if geographical location ability is present, such as Global Positioning Satellite (GPS) radio, or WiFi position sensing, etc.

WebSockets, WebWorkers—HTML5 features that some of the browsers/devices may not support. For emulation these features can be satisfied with alternate implementations.

Date Picker, Date Time Picker, Time Picker—features allowing a user to use a dedicated interface to choose date and/or time. These can be implemented if not available natively.

Drag and Drop, Session Storage, LocalStorage—features that can be supported in different ways (or not at all) on different platforms History API, Canvas, SVG, PostMessage—these are HTML5 features that can be supported in different ways (or not at all) on different platforms.

High Contrast Mode—allows greater visibility to a human viewer of items in the screen display. This can be simulated by using a changed color palette or modifying the display parameters for the items on a screen. Different browsers and/or devices may implement this feature in different ways.

Figure 3:
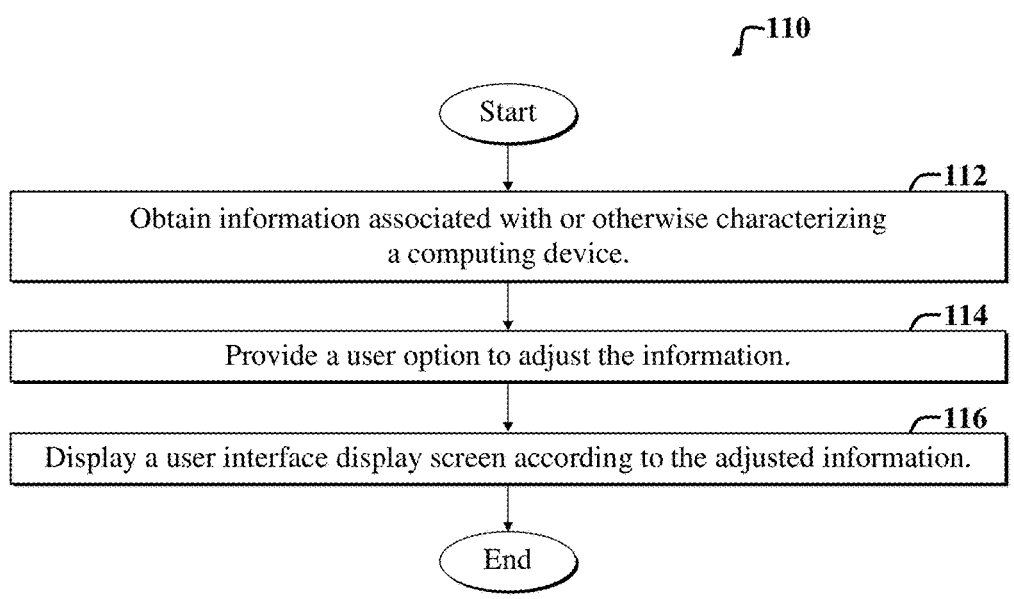
FIG. 3 is a flow diagram of a first example method adapted for use with the embodiments of FIGS. 1-2.

FIG. 3 is a flow diagram of a first example method 110 adapted for use with the embodiments of FIGS. 1-2. The example method 110 is adapted to facilitate characterizing a computing device or representation thereof.

An initial information-obtaining step 112 includes obtaining information associated with a computing device. Example information includes specification of device form factor, user selected device features or capabilities, automatically determined software capabilities, and so on.

A subsequent providing step 114 includes providing a user option to adjust the information. For example, different form factors or device features may be selected or deselected via the UI controls 22, 24, 80 of FIG. 2.

Next a displaying step includes displaying a UI display screen in accordance with adjusted information. The resulting UI display screen may include an emulation of a device to be tested, and/or may include an adjusted UI display screen of a browser used by a customer, e.g., to access enterprise cloud services.

For the purposes of the present discussion, content of a displayed webpage and/or content depicted in an emulator may represent a depiction of one or more web resources, including data and/or functionality accessible via the Internet or Web.

The example method 110 may be modified, without departing from the scope of the present teachings. For example, the method 110 may further include selectively transferring the adjusted information from a client device to a server, and storing the adjusted information in a cookie.

The displaying step 116 may further include employing server-side software, such as the webpage software 32 of FIG. 1, to adjust one or more behaviors of a software application (such as the browser software 26 of FIG. 1) used to render the UI display screen, based on the adjusted information.

The displaying step 116 may further include employing server-side software to adjust styling of the UI display screen based on the adjusted information. The UI display screen may include one or more UI controls adapted to provide the user option and to provide a mechanism (e.g., UI controls 22, 24, 80 of FIG. 2) for user entry of device form factor information pertaining to the computing device.

The example method 110 may further include running a client-side script that is adapted to automatically detect one or more features of the computing device and to incorporate one or more descriptions of the one or more features in a cookie stored on the computing device. The one or more features of the computing device may include an indication of software functionality available via the device, such as device location functionality (called GeoLocation in FIG. 2), touch screen functionality (e.g., 82 of FIG. 2), and so on.

The one or more UI controls include one or more check boxes adapted to provide a user option to specify one or more device features.

Figure 4:
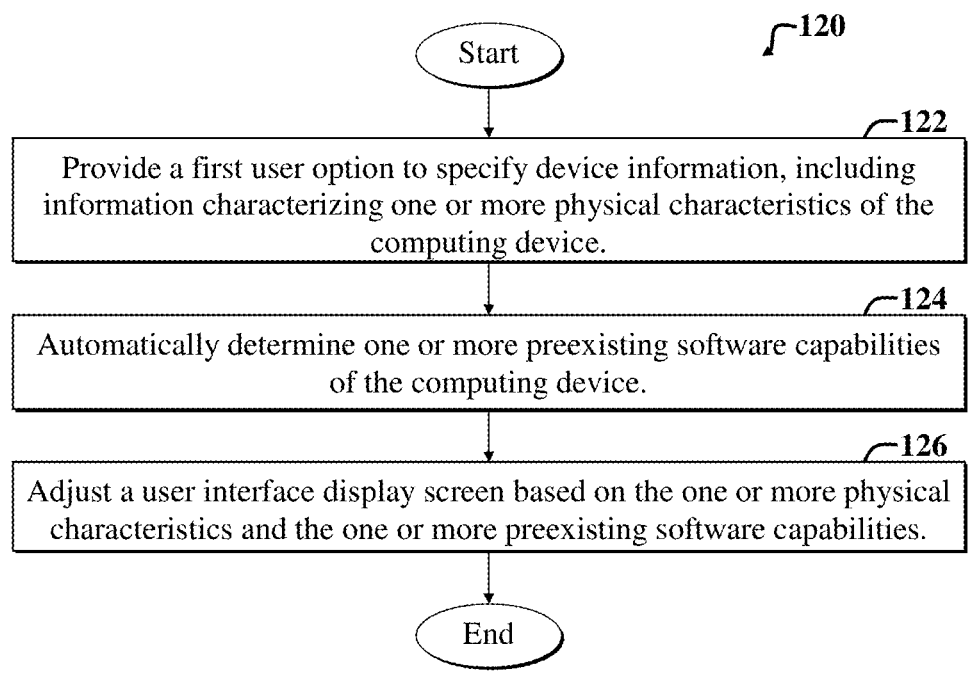
FIG. 4 is a flow diagram of a second example method adapted for use with the embodiments of FIGS. 1-3.

FIG. 4 is a flow diagram of a second example method 120 adapted for use with the embodiments of FIGS. 1-3. The example method 120 includes an initial providing step 122, which involves providing a first user option to specify device information, including information characterizing one or more physical characteristics of the computing device.

A subsequent automatic-determination step 124 includes automatically determining one or more preexisting software capabilities of the computing device. Examples of automatically determined software capabilities include information indicating which software features are available to a browser accessing a webpage that has been coded for use with embodiments discussed herein. Software features may include, for example, whether a given plugin is available to or otherwise installed for use by a browser used to access the webpage.

Next, an adjusting step 126 includes adjusting a UI display screen based on the one or more physical characteristics and the one or more preexisting software capabilities. For example, page formatting, text size, and so on, may be adjusted to display as intended in a given device screen.

The second method 120 may be altered without departing from the scope of the present teachings. For example, the second method may further include providing a third user option to specify one or more characteristics of the device that are adapted to provide user accessible software functionality.

The second method 120 may further include employing a browser cookie to store information describing the on the one or more physical characteristics and the one or more preexisting software capabilities. The cookie may then be selectively accessed by webpage software and/or client-side software to facilitate determining an adjustment to be made to rendering instructions used to display the UI display screen.

The UI display screen may represent or include a UI display screen of an application (e.g., the webpage software 32 of FIG. 1) running on a server and accessed via a client device running the browser. The UI display screen may be displayed on a developer system, a quality assurance system, and/or other system, such as a customer computer system.

The UI display screen may include q depiction of an emulated device constructed based at least in part on the one or more physical characteristics of the computing device.

Figure 5:
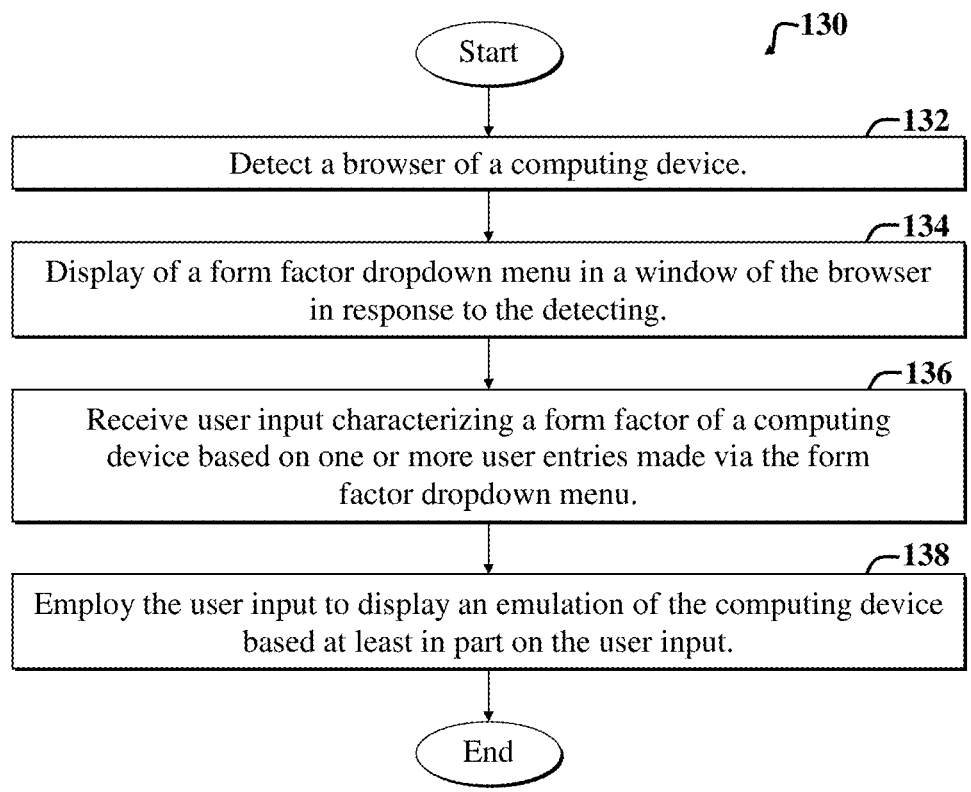
FIG. 5 is a flow diagram of a third example method adapted for use with the embodiments of FIGS. 1-4.

FIG. 5 is a flow diagram of a third example method 130 adapted for use with the embodiments of FIGS. 1-4. The third example method 130 includes a first step 132, which involves detecting a browser of a computing device.

A second step 134 includes triggering display of a form factor drop-down menu in a window of the browser in response to the detection of a browser.

A third step 136 includes receiving user input characterizing a form factor of a computing device based on one or more user entries made via the form factor drop-down menu.

A fourth step 138 includes employing the user input to display an emulation of the computing device based at least in part on the user input.

The third method 130 may be modified, without departing from the scope of the present teachings. For example, the method 130 may further include storing a representation of the user input in a cookie of the browser; and maintaining information characterizing one or more software capabilities of the computing device.

The third method 130 may further include using JavaScript to facilitate determining the information characterizing one or more software capabilities; and providing one or more user options to specify one or more features (e.g., touch screen functionality, location capabilities, and so on) of the computing device.

An additional example of an alternative method includes determining a set of features in a host computing device; indicating which features in the set of features is present to a human user; accepting a signal from a user input device to allow the human user to add and remove features from the set of features; and implementing a feature that has been added and disabling a feature that has been removed for purposes of emulating a device with a different set of features.

Although the description has been described with respect to particular embodiments thereof, these particular embodiments are merely illustrative, and not restrictive. For example, while certain embodiments are discussed with respect to facilitating device emulation and/or testing for networked enterprise computing applications, embodiments are not limited thereto. For example, embodiments adapted for standalone client-side applications may provide form factor selection options for enabling user configuration of application UI screen rendering and/or for generation of device emulation(s), without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating discovery of a software resource in a computing environment, the computing environment including one or more client devices in communication with a server system, wherein the server system executes webpage software, wherein the webpage software provides webpage information accessible to the one or more client devices, a host device executing steps of the method, the method comprising:
   determining form factor information for the host device used to emulate a client device, wherein the client device is a different type of device from the host device;
   determining a set of features available and missing from the host device for use in emulating the client device, wherein the set of features include a modification of a configuration of the host device based on a physical attribute of the client device;
   if one or more features of the client device is missing from the set of features of the host device, supplying at least one of the one or more missing features to the host device;
   indicating which features in the set of features is present to a human user;
   accepting a signal from a user input device to allow the human user to add and remove features from the set of features; and
   implementing a feature that has been added and disabling a feature that has been removed for purposes of emulating the client device with a different set of features.

2. The method of claim 1, further including:
   obtaining information associated with a computing device, the computing device representing the client device;
   providing a user option to adjust the information; and
   displaying a user interface display screen in accordance with adjusted information.

3. The method of claim 2, wherein the user interface display screen includes a representation of one or more web resources, and wherein the method further includes selectively sending the adjusted information to a server.

4. The method of claim 3, further including storing the adjusted information in a cookie.

5. The method of claim 4, wherein displaying includes receiving one or more signals from a server to adjust one or more behaviors of a software application used to render the user interface display screen, based on the adjusted information.

6. The method of claim 4, wherein displaying further includes receiving one or more signals from a server to adjust styling of the user interface display screen based on the adjusted information.

7. The method of claim 2, further including displaying, via the user interface display screen, one or more user interface controls adapted to provide the user option, wherein the one or more user interface controls are adapted to provide a mechanism for user entry of device form factor information pertaining to the computing device.

8. The method of claim 7, wherein the one or more user interface controls include one or more drop-down menus with user selectable form factor information.

9. The method of claim 8, further including running a client-side script that is adapted to automatically detect one or more features of the computing device and to incorporate one or more descriptions of the one or more features in a cookie stored on the computing device.

10. The method of claim 9, wherein the client-side script includes code written in JavaScript.

11. The method of claim 9, wherein the one or more features of the computing device include an indication of software functionality available via the client device.

12. The method of claim 9, wherein the one or more features include device location functionality.

13. The method of claim 8, wherein the one or more user interface controls include one or more check boxes adapted to provide a user option to specify one or more device features.

14. The method of claim 2, further including:
providing a first user option to specify device information, including information characterizing one or more physical characteristics of the computing device;
automatically determining one or more preexisting software capabilities of the computing device; and
adjusting the user interface display screen based on the one or more physical characteristics and the one or more preexisting software capabilities.

15. The method of claim 14, further including:
employing a cookie of a browser to store information describing the one or more physical characteristics and the one or more preexisting software capabilities; and
selectively accessing the cookie to determine an adjustment to be made to rendering instructions used to display the user interface display screen, wherein the user interface display screen includes a user interface display screen of an application running on a server and accessed via a client device running the browser.

16. The method of claim 15, wherein the user interface display screen includes a user interface display screen implemented via a developer system, and wherein the user interface display screen includes a depiction of an emulated device constructed based at least in part on the one or more physical characteristics of the computing device, and further including rendering the depiction in a browser window, wherein the information characterizing one or more physical characteristics of the computing device includes device form factor information.

17. The method of claim 2, further including:
detecting a browser of the computing device;
triggering display of a form factor drop-down menu in a window of the browser in response to the detecting;
receiving user input characterizing a form factor of a computing device based on one or more user entries made via the form factor drop-down menu; and
employing the user input to display an emulation of the computing device based at least in part on the user input.

18. The method of claim 17, further including:
storing a representation of the user input in a cookie of the browser; and
maintaining information characterizing one or more software capabilities of the computing device, wherein the one or more software capabilities include one or more automatically determined software capabilities of the computing device.

19. An apparatus for facilitating discovery of a software resource in a computing environment, the computing environment including one or more client devices in communication with a server system, wherein the server system executes webpage software, wherein the webpage software provides webpage information accessible to the one or more client devices, a host device coupled to a display and configured to perform the following acts:
determining form factor information for the host device used to emulate a client device, wherein the client device is a different type of device from the host device;
determining a set of features available and missing from the host device for use in emulating the client device, wherein the set of features include a modification of a configuration of the host device based on a physical attribute of the client device;
if one or more features of the client device is missing from the set of features of the host device, supplying at least one of the one or more missing features to the host device;
indicating which features in the set of features is present to a human user;
accepting a signal from a user input device to allow the human user to add and remove features from the set of features; and
implementing a feature that has been added and disabling a feature that has been removed for purposes of emulating the client device with a different set of features.

20. A tangible storage medium including instructions executable by a host device for facilitating discovery of a software resource in a computing environment, the computing environment including one or more client devices in communication with a server system, wherein the server system executes webpage software, wherein the webpage software provides webpage information accessible to the one or more client devices, the tangible storage medium including instructions for:
determining form factor information for the host device employed to emulate the client device, wherein the client device is a different type of device from the host device;
determining a set of features available and missing from the host device for use in emulating the client device, wherein the set of features include a modification of a configuration of the host device based on a physical attribute of the client device;
if one or more features of the client device is missing from the set of features of the host device, supplying at least one of the one or more missing features to the host device;
indicating which features in the set of features is present to a human user;
accepting a signal from a user input device to allow the human user to add and remove features from the set of features; and
implementing a feature that has been added and disabling a feature that has been removed for purposes of emulating the client device with a different set of features.

21. The apparatus of claim 19, further including:
obtaining information associated with a computing device, the computing device representing the client device;
providing a user option to adjust the information; and
displaying a user interface display screen in accordance with adjusted information.

22. The apparatus of claim 21, wherein the user interface display screen includes a representation of one or more web resources, and wherein the acts further include selectively sending the adjusted information to a server.

23. The apparatus of claim 21, further including displaying, via the user interface display screen, one or more user interface controls adapted to provide the user option, wherein the one or more user interface controls are adapted to provide a mechanism for user entry of device form factor information pertaining to the computing device.

24. The apparatus of claim 21, further including:
providing a first user option to specify device information, including information characterizing one or more physical characteristics of the computing device;
automatically determining one or more preexisting software capabilities of the computing device; and
adjusting the user interface display screen based on the one or more physical characteristics and the one or more preexisting software capabilities.

25. The apparatus of claim 21, further including:
detecting a browser of the computing device;
triggering display of a form factor drop-down menu in a window of the browser in response to the detecting;
receiving user input characterizing a form factor of a computing device based on one or more user entries made via the form factor drop-down menu; and
employing the user input to display an emulation of the computing device based at least in part on the user input.

26. The tangible storage medium of claim 20, further including:
obtaining information associated with a computing device, the computing device representing the client device;
providing a user option to adjust the information; and
displaying a user interface display screen in accordance with adjusted information.

27. The tangible storage medium of claim 26, wherein the user interface display screen includes a representation of one or more web resources, and wherein the instructions further include selectively sending the adjusted information to a server.

28. The tangible storage medium of claim 26, further including displaying, via the user interface display screen, one or more user interface controls adapted to provide the user option, wherein the one or more user interface controls are adapted to provide a mechanism for user entry of device form factor information pertaining to the computing device.

29. The tangible storage medium of claim 26, further including:
providing a first user option to specify device information, including information characterizing one or more physical characteristics of the computing device;
automatically determining one or more preexisting software capabilities of the computing device; and
adjusting the user interface display screen based on the one or more physical characteristics and the one or more preexisting software capabilities.

30. The tangible storage medium of claim 26, further including:
detecting a browser of the computing device;
triggering display of a form factor drop-down menu in a window of the browser in response to the detecting;
receiving user input characterizing a form factor of a computing device based on one or more user entries made via the form factor drop-down menu; and
employing the user input to display an emulation of the computing device based at least in part on the user input.

* * * * *

UNITED STATES PATENT AND TRADEMARK OFFICE
CERTIFICATE OF CORRECTION

PATENT NO. : 9,900,369 B2
APPLICATION NO. : 14/535273
DATED : February 20, 2018
INVENTOR(S) : Afzal Page 1 of 1

It is certified that error appears in the above-identified patent and that said Letters Patent is hereby corrected as shown below:

In the Specification

In Column 12, Line 43, after "platforms" insert -- . --.

Signed and Sealed this
Twenty-first Day of August, 2018

Andrei Iancu
*Director of the United States Patent and Trademark Office*